(12) United States Patent
Smedley et al.

(10) Patent No.: US 11,245,144 B2
(45) Date of Patent: Feb. 8, 2022

(54) METAL-AIR FUEL CELL

(71) Applicant: ZINC8 ENERGY SOLUTIONS INC., Vancouver (CA)

(72) Inventors: Stuart Smedley, Oceanside, CA (US); Wolf Tivy, Vancouver (CA); Boguslaw Wozniczka, Coquitlam (CA); David Robert Bruce, Vancouver (CA)

(73) Assignee: ZINC8 ENERGY SOLUTIONS INC., Vancouver (CA)

( * ) Notice: Subject to any disclaimer, the term of this patent is extended or adjusted under 35 U.S.C. 154(b) by 0 days.

(21) Appl. No.: 17/036,642

(22) Filed: Sep. 29, 2020

(65) Prior Publication Data
US 2021/0083346 A1 Mar. 18, 2021

Related U.S. Application Data

(60) Division of application No. 15/923,256, filed on Mar. 16, 2018, now Pat. No. 10,826,142, which is a
(Continued)

(51) Int. Cl.
| | |
|---|---|
| *H01M 12/06* | (2006.01) |
| *H01M 4/06* | (2006.01) |
| *H01M 8/22* | (2006.01) |
| *H01M 4/42* | (2006.01) |

(Continued)

(52) U.S. Cl.
CPC ............ *H01M 12/06* (2013.01); *H01M 4/06* (2013.01); *H01M 4/42* (2013.01); *H01M 4/78* (2013.01);
(Continued)

(58) Field of Classification Search
CPC .......... H01M 12/06; H01M 4/06; H01M 4/42; H01M 4/78; H01M 8/225; H01M 2004/027; H01M 2300/0014
See application file for complete search history.

(56) References Cited

U.S. PATENT DOCUMENTS

| | | | |
|---|---|---|---|
| 3,849,202 A | 11/1974 | Pompon | |
| 4,038,458 A | 7/1977 | Jacquelin | |

(Continued)

FOREIGN PATENT DOCUMENTS

| | | |
|---|---|---|
| CN | 2777770 Y | 5/2006 |
| EP | 0 458 395 A1 | 5/1991 |

OTHER PUBLICATIONS

International Search Report dated Nov. 25, 2016 for International Application No. PCT/CA2016/051080 (6 pages).
(Continued)

*Primary Examiner* — Christopher P Domone
*Assistant Examiner* — Kimberly Wyluda
(74) *Attorney, Agent, or Firm* — Taylor IP, P.C.

(57) ABSTRACT

A method of charging a metal-air fuel cell. The method includes a step of orienting an anode chamber horizontally. The method further method includes a step of providing metal particles suspended in an electrolyte to flow through the anode chamber in a downstream direction oriented horizontally. The method further method includes a step of allowing a bed of the metal particles to form on the anode current collector. The plurality of particle collectors perturb the flow of electrolyte through the anode chamber and encourage settling of the particles one of on and between the particle collectors. The method further method includes a step of maintaining uniform formation of the bed.

13 Claims, 6 Drawing Sheets

Related U.S. Application Data continuation of application No. PCT/CA2016/051080, filed on Sep. 13, 2016.

(60) Provisional application No. 62/219,984, filed on Sep. 17, 2015.

(51) Int. Cl.
*H01M 4/78* (2006.01)
*H01M 4/02* (2006.01)

(52) U.S. Cl.
CPC ...... *H01M 8/225* (2013.01); *H01M 2004/027* (2013.01); *H01M 2300/0014* (2013.01)

(56) References Cited

U.S. PATENT DOCUMENTS

| | | |
|---|---|---|
| 4,139,679 A | 2/1979 | Appleby et al. |
| 4,517,258 A | 5/1985 | Bronoël |
| 5,434,020 A | 7/1995 | Cooper |
| 5,849,427 A | 12/1998 | Siu et al. |
| 6,787,260 B2 | 9/2004 | Smedley |
| 2004/0053132 A1 | 3/2004 | Smedley et al. |
| 2009/0075170 A1 | 3/2009 | Cooper |
| 2011/0207001 A1 | 8/2011 | Bert et al. |
| 2012/0034541 A1 | 2/2012 | Muraoka et al. |
| 2014/0370401 A1 | 12/2014 | Kisdarjono et al. |

OTHER PUBLICATIONS

Written Opinion of the International Searching Authority dated Nov. 25, 2016 for International Application No. PCT/CA2016/051080 (7 pages).

International Preliminary Report on Patentability dated Jun. 1, 2017 for International Application No. PCT/CA2016/051080 (34 pages).

Jiratchayamaethasakul, C. et al. (2014). Effects of anode orientation and flow channel design on performance of refuelable zinc-air fuel cells. Journal of Applied Electrochemistry, 44(11), 1205-1218. doi: 10.1007/s (Year: 2014).

METAL-AIR FUEL CELL

CROSS REFERENCE TO RELATED APPLICATIONS

This is a division of U.S. patent application Ser. No. 15/923,256, entitled "METAL-AIR FUEL CELL", filed Mar. 16, 2018, which is a continuation of PCT application No. PCT/CA2016/051080, entitled "METAL-AIR FUEL CELL", filed Sep. 13, 2016, which are both incorporated herein by reference. PCT/CA2016/051080 is a PCT application based upon U.S. provisional patent application Ser. No. 62/219,984, entitled "METAL-AIR FUEL CELL", filed Sep. 17, 2015, which is also incorporated herein by reference.

BACKGROUND OF THE INVENTION

Technical Field

This invention relates to metal-air fuel cells, such as zinc-air fuel cells.

Background

Metal-air fuel cells provide high energy efficiency and yet are low cost with low environmental impact. The zinc-air fuel cell is an example of a metal-air fuel cell. In a zinc air fuel cell, zinc metals are provided as fuel, air is provided as an oxygen source, and an aqueous alkaline solution, such as potassium hydroxide (KOH), is provided as an electrolyte. When an electric circuit is closed, the anode consumes zinc metal via the anode or negative electrode reaction,

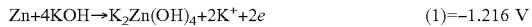
$$Zn + 4KOH \rightarrow K_2Zn(OH)_4 + 2K^+ + 2e \quad (1) = -1.216 \text{ V}$$

Zinc metal is consumed as it reacts with potassium hydroxide, potassium zincate is formed ($K_2Zn(OH)_4$) and electrons are released to an anode current conductor.

Oxygen is supplied to the cathode and reacts with $H_2O$ and electrons on the cathode to form hydroxyl ions ($OH^-$). The cathode or positive electrode reaction is therefore,

$$\tfrac{1}{2}O_2 + H_2O + 2e \rightarrow 2OH^- \quad (2) \quad E^0 = 0.401 \text{ V}$$

The hydroxyl ions from equation (2) and the potassium ions from equation (1) then react with zinc metal again in equation (1) at the anode.

According to this reaction scheme, the oxidation of zinc and the reduction of oxygen cause the change of chemical energy into electrical energy. For the reactions to proceed over long times there must be a continuous supply of zinc metal and air as well as a means of constant flow of electrons from the system, i.e., connection to a load.

In previous zinc-air implementations the metal electrodes have had a fixed quantity of zinc, limiting their available energy and having rechargeability drawbacks due to size augmentation of the electrodes upon cycling. Decreases in the electrode area leads to a decrease in power of the fuel cell system.

Improved metal-air fuel cells are desirable.

SUMMARY OF THE INVENTION

The inventions described herein have many aspects, some of which relate to fuel cells, fuel cell stacks, metal-air fuel cell system, and methods of charging metal-air fuel cells.

In one aspect a fuel cell is provided. The fuel cell comprises: a cathode; an anode comprising an anode chamber and an anode current collector, the anode chamber at least partially defined by the anode current collector; and a cathode chamber at least partially defined by the cathode. The anode chamber comprises one or a plurality of anode flow channels for flowing an electrolyte in a downstream direction.

The anode current collector may comprise a plurality of particle collectors projecting into the anode chamber to collect particles suspended in the electrolyte.

In another aspect, a method of charging a metal-air fuel cell is provided. The method includes a step of orienting an anode chamber horizontally. A corresponding anode current collector is positioned below the anode chamber. The anode current collector includes a plurality of particle collectors projecting into the anode chamber. The method further method includes a step of providing metal particles suspended in an electrolyte to flow through the anode chamber in a downstream direction oriented horizontally. The method further method includes a step of allowing a bed of the metal particles to form on the anode current collector. The plurality of particle collectors perturb the flow of electrolyte through the anode chamber and encourage settling of the particles one of on and between the particle collectors. The method further method includes a step of maintaining uniform formation of the bed.

The plurality of particle collectors may be configured to perturb the flow of electrolyte through the anode chamber and encourage settling of the particles on or between the particle collectors.

The particle collector may comprise a laterally elongated member. The laterally elongated member may extend up to a width of the anode flow channel. The angle defined between the laterally elongated member and a planar portion of the anode current collector in the upstream direction may be between 10 to 90 degrees, or 20 to 80 degrees, or 30 to 70 degrees, or 90 to 120 degrees, or 120 to 180 degrees. The height of the laterally elongated member relative to the planar portion of the anode current collector may range from 0.2 mm to 5.0 mm, or 0.5 to 3.0 mm, or 1.0 to 2.0 mm. The ratio of (i) a height of the laterally elongated member relative to the planar portion of the anode current collector and (ii) a height of the anode chamber may range from 0.1 to 0.6, or 0.2 to 0.5, or 0.3 to 0.4.

The number of the particle collectors per linear centimeter may range from 0.5 to 10, or 1 to 5, or 1 to 2. The distance between adjacent particle collectors may be less than a height of the particle collector relative to a planar portion of the anode current collector. The plurality of particle collectors may be arranged in an array configured to form a uniform bed of the particles on the anode current collector.

The anode chamber may comprise a parallel flow configuration or a serpentine flow configuration. The anode flow channels may comprise length to width ratios in the ranges of 50:1 to 2:1, 25:1 to 4:1, or 10:1 to 5:1. The width of the anode flow channels may range from 2 mm to 20 cm, 5 mm to 10 cm, or 1 cm to 5 cm.

The cathode and anode current collector may be planar. The surface area of the anode current collector may range from 1 cm² to 1 m².

The height of an electrolyte flow field within the anode chamber may be 0.5 mm to 4 mm, 1 mm to 3 mm, or 2 mm.

The fuel cell may be a zinc-air fuel cell and the particles may be zinc particles. The electrolyte may be potassium hydroxide.

According to another aspect, a fuel cell stack is provided. The fuel stack comprising a plurality of fuel cells as described herein. The plurality of fuel cells may be oriented horizontally and stacked on top of one another to form the fuel cell stack, or may be oriented vertically and stacked beside one another to form the fuel cell stack.

According to another aspect, a metal-air fuel cell system is provided. The metal-air fuel cell system comprises: a fuel cell as described herein; a metal electrolyzer comprising in fluid communication with an outlet of the fuel cell; and a tank in fluid communication with an outlet of the metal electrolyzer and an inlet of the fuel cell. The fuel cell may be a zinc-air fuel cell and the metal electrolyzer may be a zinc electrolyzer.

According to another aspect, a method of charging a metal-air fuel cell is provided. The method comprises:
(a) orienting an anode chamber horizontally wherein a corresponding anode current collector is positioned below the anode chamber;
(b) providing metal particles suspended in an electrolyte to flow through the anode chamber;
(c) allowing a bed of the metal particles to form on the anode current collector; and
(d) maintaining uniform formation of the bed.

Step (c) may comprise one or more of:
(i) maintaining the flow of the metal particles suspended in the electrolyte at a predetermined flow rate;
(ii) periodically stopping the flow of the metal particles suspended in the electrolyte; and
(iii) providing a plurality of particle collectors on the anode current collector.

Step (d) may comprise providing a uniform flow of the electrolyte through the anode chamber. Providing the uniform flow may comprise providing a continuous pressure drop in a downstream direction in the anode chamber and a minimal pressure drop in a direction normal to the downstream direction. Providing the continuous pressure drop in the downstream direction and the minimal pressure drop in the direction normal to the downstream direction may comprise providing a parallel or serpentine flow path for the anode chamber. Providing the parallel or serpentine flow path may comprise providing channels for the parallel or serpentine flow path defined by a length to width aspect ratio of 50:1 to 2:1, 25:1 to 4:1, or 6:1 to 5:1.

Step (c) may comprise forming the bed to a depth of 0.2 mm to 2.0 cm, or 1 mm to 1.0 cm, or 2 mm to 4 mm, or 0.5 mm to 2 mm. Step (c) may comprise forming the bed to a depth wherein a ratio of the depth to a height of the anode chamber ranges from 0.1 to 0.6, or 0.2 to 0.5, or 0.3 to 0.4.

Step (b) may comprise providing metal particles ranging in size from 5 nm to 1 mm, 5 nm to 0.5 mm, or 5 nm to 0.3 mm.

The flow velocity of the electrolyte in the anode chamber may range from 1 $cm^3/s$ to 5000 $cm^3/s$. The flow rate of the electrolyte in the anode chamber may range from 1 L/min. to 7 L/min, or 3 L/min. to 7 L/min or 3 L/min. to 5 L/min.

The gauge pressure of the electrolyte in the anode chamber may range from 0.69 kPa to 103.4 kPa, or from 13.8 kPa to 68.9 kPa. The pressure drop traversing the anode chamber may be less than 103.4 kPa.

The metal particles may be zinc particles, and the electrolyte may be aqueous potassium hydroxide. The concentration of potassium hydroxide may be 5% to 60% by weight, or 20% to 50% by weight, or 30% to 45% by weight.

The method may comprise drawing a current density of 50 $mA/cm^2$ or more from the fuel cell. The method may comprise applying a load to the fuel cell and discharging for a period of 1 to 20 hours.

The foregoing discussion merely summarizes certain aspects of the inventions and is not intended, nor should it be construed, as limiting the inventions in any way.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1A:
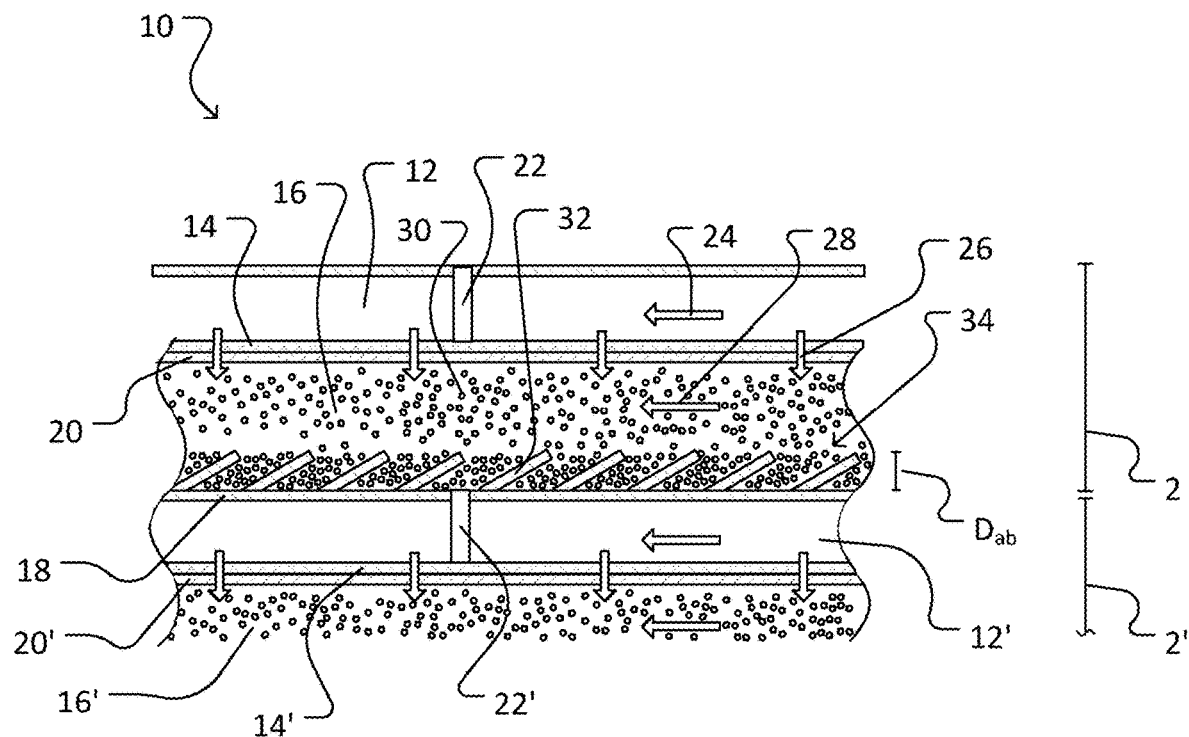
FIG. 1A is a partial cutaway side view of a fuel cell according to an embodiment of the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

A number of directional conventions are employed in this specification to help clarify their meaning, as follows:

"upstream" and "downstream" as used herein relate to directions, orientations, positions or arrangements of features relative to the flow of electrolyte from the inlet of the anode chamber to the outlet of anode chamber, wherein relative to a first position within the anode chamber from the inlet of the anode chamber, a second position in the anode chamber closer to the inlet along the flow path of the electrolyte is "upstream", and a third position within the anode chamber further away from the inlet along the flow path of the electrolyte is "downstream";

"lateral, "laterally" and the like as used herein relates to the directions normal to the flow of electrolyte from the inlet of the anode chamber to the outlet of anode chamber or from the inlet of an anode channel to the outlet of an anode channel;

"horizontal" and "horizontally" as used herein refers to an orientation parallel to the ground; and "top", "bottom", "above" and "below" as used herein refer to the orientations, positions or arrangements of features when the anode chamber is oriented substantially horizontally.

The term "fuel cell" as used herein refers to an electrochemical device as would be understood by a person skilled in the art. The term "fuel cell" includes, without limitation, devices known as "flow batteries" and similar terminology.

The term "uniform" as used herein with reference to an anode bed refers to an anode bed with an substantially even distribution of metal particles.

The term "substantially" as used herein refers to the complete or nearly complete extent or degree of an action, characteristic or result. For example, a "substantially" continuous pressure drop would mean that the pressure drop is either completely continuous or nearly completely continuous. The exact allowable degree of deviation from absolute completeness may in some cases depend on the specific context. However, generally speaking the nearness of completion will be so as to have the same overall result as if total completion were obtained. The use of "substantially" is equally applicable when used in a negative connotation to refer to the complete or near complete lack of an action, characteristic or result. For example, "substantially" no pressure drop refers to either a complete lack of pressure drop, or a lack of pressure drop so nearly complete that the effect would be the same as if there was no pressure drop. In other words, "substantially" no pressure drop means that there may still be a measurable pressure drop as long as there is no measurable effect thereof.

Conventional anode beds for zinc-air fuel cells are formed by one of two approaches. One approach is to form a dense bed of packed zinc particles where the electrolyte is forced to flow through the bed at high pressure. The inventors have determined at least two drawbacks with this approach. First, the amount of pressure that can be mechanically tolerated by a fuel cell limits the pumping pressure to below about 68948 Pa since higher pressures would place too much mechanical stress on the fuel cell. Second, reducing pumping pressure limits the range of particle sizes that can be used. A pumping pressure below 68948 Pa is only useful in an anode bed where the mean particle size is above 200 microns; using smaller particles would require pumping pressures that are too high, e.g. as high as 689476 Pa, in order to maintain sufficient zinc dissolution reactions.

An alternative approach is to pump a slurry or suspension of zinc particles through the anode chamber. In the absence of a packed particle bed the pumping pressures are much lower, for example lower than 55.2 kPa. However with this approach, the inventors have determined that the particles make only transient contact with the anode current collector, and the current density generated is therefore limited by the number of transient contacts that are formed at any instant.

Claims of the present invention relate to high energy efficiency metal-air fuel cells. In one embodiment, a fuel cell with a substantially horizontally-oriented anode chamber is provided. Small metal particles, such as in the range of 15 nm to 300 microns, suspended in electrolyte are pumped into the anode chamber at low pressure, such as below 68.9 kPa. A dense bed of the metal particles is formed on an anode current collector at low electrolyte pressures by gravitational settling and one or more of: controlling the electrolyte flow rate; intermittently stopping the electrolyte flow; and providing particle collectors on the anode current collector. The advantages of this approach include low electrolyte pressure (to reduce pumping energy costs and mechanical stress) and small metal particle size (to increase electrical current generation), which are made possible by the anodic reaction occurring along the top of the anode bed, as well as through the anode bed. At any moment, more metal particles are in contact with each other and with the anode current collector. Thus the total surface area of metal particles contributing to the electrode reaction and generation of electrical current is much greater, in turn leading to higher energy efficiency. Electrolyte flow along and through the anode bed also removes oxidized metal reaction products from the reaction site.

Figure 1B:
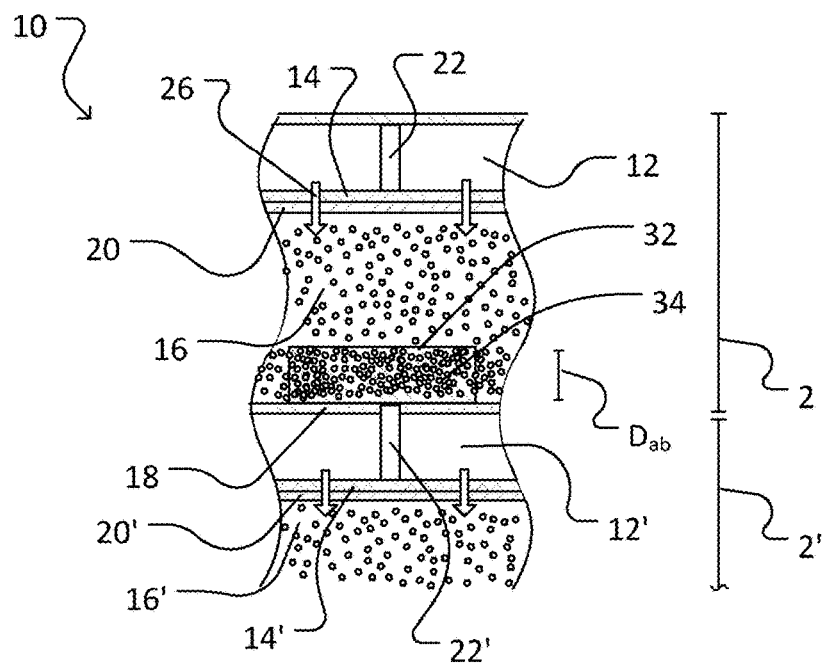
FIG. 1B is a partial cutaway side view, perpendicular to the view shown in FIG. 1A, of the embodiment shown in FIG. 1A.

FIG. 1A shows part of a fuel cell stack 10 according to one embodiment of the invention. Fuel cell stack 10 is comprised of a plurality of vertically stacked fuel cells. FIG. 1A shows a first fuel cell 2, and part of an identical, partial second fuel cell 2' below fuel cell 2. In some embodiments the fuel cell stack may only comprise a single fuel cell. In some embodiments, such as in fuel cell stack 10, the fuel cells are oriented horizontally and stacked on top of one another to form a fuel cell stack. In some embodiments, the fuel cells are oriented vertically and stacked beside one another to form a fuel cell stack. FIG. 1B shows the alternate side view of fuel cell stack 10 as seen perpendicular to FIG. 1A.

Fuel cell 2 of fuel cell stack 10 includes a cathode chamber 12, cathode 14, anode chamber 16, anode current collector 18 and a separator 20. The section of fuel cell 2' of fuel cell stack 10 shown in FIG. 1A includes cathode chamber 12', cathode 14', and anode chamber 16'. Separator 20 prevents electrical contact between the cathode 14 and the anode chamber 16 but allows for ionic conductivity between the two. A contact pin 22' electrically connects anode current collector 18 to cathode 14' to close the circuit. In an alternate arrangement contact pin 22' and anode current collector 18 are integrally formed. The components of fuel cell 2 of fuel cell stack 10 will be described in greater detail herein but it will be understood that the features and functions of the components of other fuel cells of fuel cell stack 10, including fuel cell 2', will correspond to those of the components of fuel cell 2.

Suitable construction and configuration of cathode chamber 12 and cathode 14, as known in the art, are provided to extract oxygen from air flowing through cathode chamber 12 (direction of air flow represented by arrow 24) by electrochemical reduction of oxygen at cathode 14, and to allow migration of formed hydroxide into anode chamber 16 (direction of oxygen extraction/reduction and hydroxide ion migration represented by arrow 26). In some embodiments, such as in fuel cell stack 10, cathode 14 is generally planar.

Anode chamber 16 is shaped to permit metal particles 30 suspended in an electrolyte to flow therethrough in a downstream direction as represented by arrow 28. In some embodiments, the metal particles may be zinc, aluminum, beryllium, calcium, iron, lithium, magnesium, sodium, titanium, or a mixture of such metals. In the illustrated embodiment, metal particles 30 are zinc particles. In some embodiments, the metal particles may range in size from 5 nm to 1 mm, or 5 nm to 0.5 mm, or 5 nm to 0.3 mm.

In some embodiments, the electrolyte may be alkaline, such as an aqueous alkali hydroxide. In some embodiments, the aqueous alkali hydroxide may be aqueous potassium hydroxide or aqueous sodium hydroxide. In some embodiments, the concentration of the aqueous alkali hydroxide may range from 5% to 60% by weight, or 20% to 50% by weight, or 30% to 45% by weight. In other embodiments, the electrolyte may be non-alkaline.

In some embodiments, such as in fuel cell 2, anode current collector 18 is made of a material with high conductivity and high stability in aqueous alkaline solutions. In example embodiments, the anode current collector may be stainless steel, nickel, iron, titanium, copper, gold, silver, magnesium, indium, lead, or carbon. In other embodiments alloys or conductive oxides of combinations of these and other elements are employed. In some embodiments, anode current collector 18 is generally planar. Anode current collector 18 is disposed opposite of cathode 14 with anode chamber 16 at least partially defined therebetween. In some embodiments, the surface area of each of cathode 14 and anode current collector 18 may range from 1 cm' to 1 m$^2$. In an example embodiment, the surface area of cathode 14 and anode current collector 18 are each about 500 cm$^2$ and separated by about 3 mm.

In some embodiments, such as in fuel cell 2, anode current collector 18 includes a plurality of particle collectors 32 projecting into anode chamber 16. Particle collectors 32 may be of any shape and configuration suitable for collecting particles 30 suspended in the electrolyte and flowing through anode chamber 16. In some embodiments, particle collectors 32 are of suitable size, shape, configuration and/or array for trapping particles 30 and facilitating their formation into an anode bed 34 on anode current collector 18. In some embodiments, particle collectors 32 are of suitable size, shape, configuration and/or array for establishing a series of obstacles that perturb the flow of electrolyte through anode chamber 16 and encourage the settling of particles on or between the particle collectors. FIGS. 4A to 4F show non-limiting examples of side views of other possible shapes of particle collectors 32. In some embodiments particle collectors 32 may be porous, or have holes, slits, and the like to enhance circulation of electrolyte. In a particular embodiment, particle collectors 32 are formed from a conductive mesh. The mesh should limit pore sizes to a suitable size, shape, configuration and/or array to facilitate trapping particles.

In a particular embodiment particle collectors 32 are constructed of the same conductive material as anode current collector 18. In other embodiments particle collectors 32 may be constructed of a different conductive material or non-conductive material. In a particular embodiment, particle collectors 32 are integrally formed with anode current collector 18. In other embodiments particle collectors 32 may be formed separately and then coupled to anode current collector 18. In some embodiments the surface of anode current collector 18 is provided with sufficient particle collectors 32 to form a uniform anode bed 34.

Figure 2:
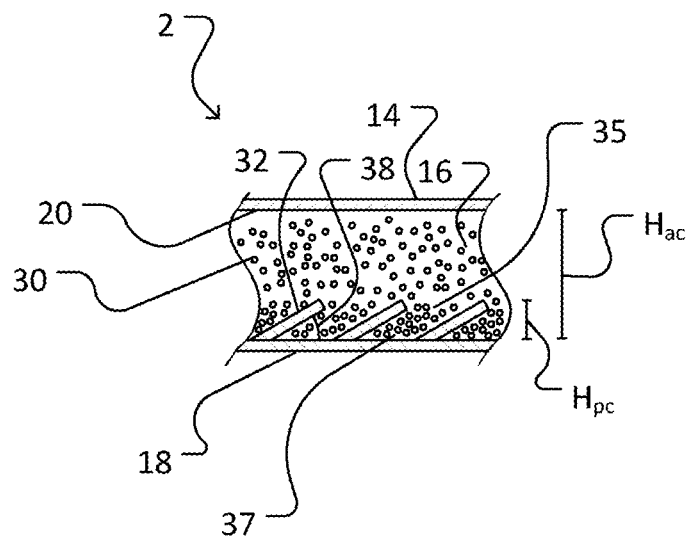
FIG. 2 is a close up partial cutaway side view of the embodiment shown in FIG. 1A.

As shown in FIG. 2, each particle collector 32 at least partially defines an opening 35 for receiving particles 30 flowing downstream through anode chamber 16. In some embodiments, such as in fuel cell 2, opening 35 may face a generally upstream or downstream direction. Each particle collector 32 also at least partially defines a pocket or well 37 shaped to accumulate trapped particles 30 therein. Opening 35 is in fluid communication with well 37. In some embodiments, such as in fuel cell 2, opening 35 defines an opening of well 37. The size of opening 35 and well 37 may be partly defined by an angle 38 defined between particle collector 32 and a planar portion of anode current collector 18 in the upstream direction. In some embodiments, angle 38 may be between 5 to 90 degrees, or 20 to 70 degrees, or 30 to 60 degrees. In some embodiments, angle 38 may be between 90 to 120 degrees, or 120 to 180 degrees.

Figure 3:
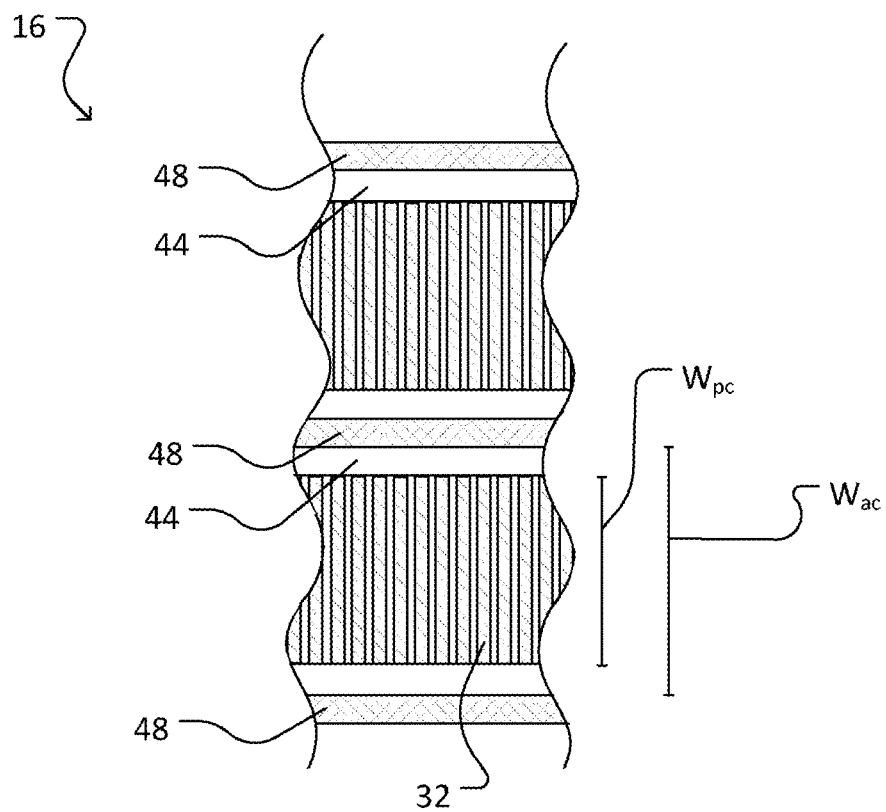
FIG. 3 is a partial top view of an anode chamber according to an embodiment of the invention.
Figure 4A:
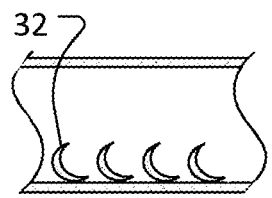
FIGS. 4A to 4F are partial cutaway side views of various embodiments of the invention.
Figure 4B:
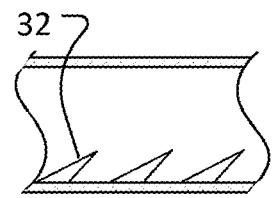
Figure 4C:
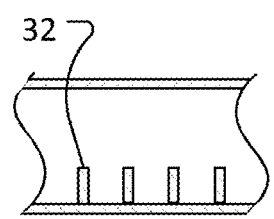
Figure 4D:
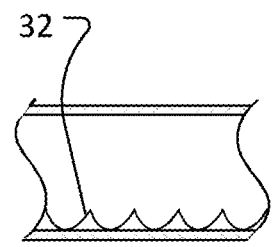
Figure 4E:
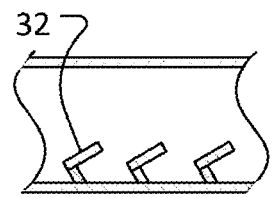
Figure 4F:
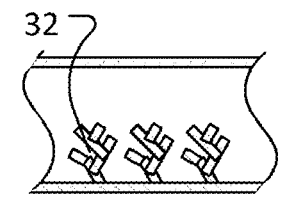

As shown in FIG. 3, anode chamber 16 may be subdivided into a plurality of substantially parallel anode channels 44 separated by internal walls 48. In the embodiment shown in FIGS. 1 to 3, particle collector 32 is a laterally-elongated scoop. In some embodiments, the lateral width $W_{pc}$ of each scoop 32 extends up to a width $W_{ac}$ of anode channel 44. In some embodiments, the number of particle collectors 32 per linear centimeter (in the upstream/downstream direction) ranges from 0.5 to 10, or 1 to 5, or 1 to 2. In some embodiments, electrolyte in adjacent channels may flow in the same direction. In other embodiments, electrolyte in adjacent channels may flow in opposite directions.

In some embodiments, the particle collector 32 features are microscopic and can be considered simply as an increase in surface roughness of the anode channels 44. The increase in surface roughness as compared to a smooth planar surface ranges from 4:1 to 10,000:1, or 10:1 to 1000:1, or 50:1 to 500:1.

Figure 5A:
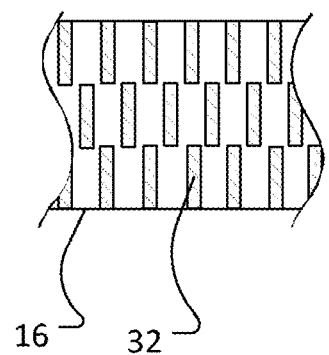
FIGS. 5A to 5C are partial top views of various anode chambers according to embodiments of the invention.
Figure 5B:
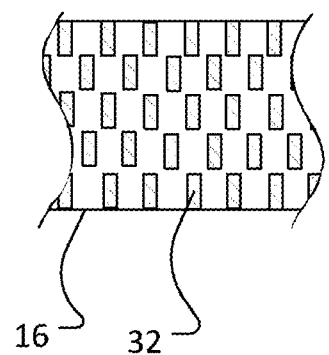
Figure 5C:
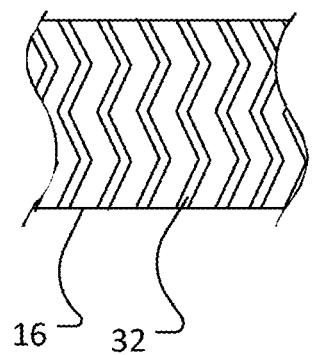

In some embodiments, particle collectors 32 may be arranged in a staggered array or other repeating or random array that facilitates formation of a uniform anode bed 34 and does not interfere with uniform flow of electrolyte. FIGS. 5A to 5C show non-limiting examples of top views of other possible configurations of particle collectors 32.

As shown in FIG. 2, the height $H_{pc}$ of particle collector 32 is limited to a height that does not significantly impede the flow of electrolyte through anode chamber 16. In some embodiments, height $H_{pc}$ relative to the planar portion of anode current collector 18 ranges from 0.2 mm to 5.0 mm, or 0.5 to 3.0 mm, or 1.0 to 2.0 mm. In some embodiments, a ratio of height $H_{pc}$ to the height of the anode chamber 16 ($H_{ac}$) ranges from 0.1 to 0.6, or 0.2 to 0.5, or 0.3 to 0.4.

The formation of anode bed 34 is controlled (as described further below) to ensure it does not significantly impede the flow of electrolyte through anode chamber 16. In some embodiments the depth $D_{ab}$ of anode bed 34 does not exceed the height $H_{pc}$ of particle collectors 32. In some embodiments anode bed 34 may have a depth $D_{ab}$ ranging from 0.2 mm to 20 mm, or 1 mm to 10 mm, or 2 mm to 4 mm, or 0.5 mm to 2 mm, and in some embodiments anode bed 34 may have a depth $D_{ab}$ wherein a ratio of depth $D_{ab}$ to a height of the anode chamber $H_{ac}$ ranges from 0.1 to 0.6, or 0.2 to 0.5, or 0.3 to 0.4. In some embodiments, depth $D_{ab}$ is uniform across most or all of anode bed 34.

Figure 6A:
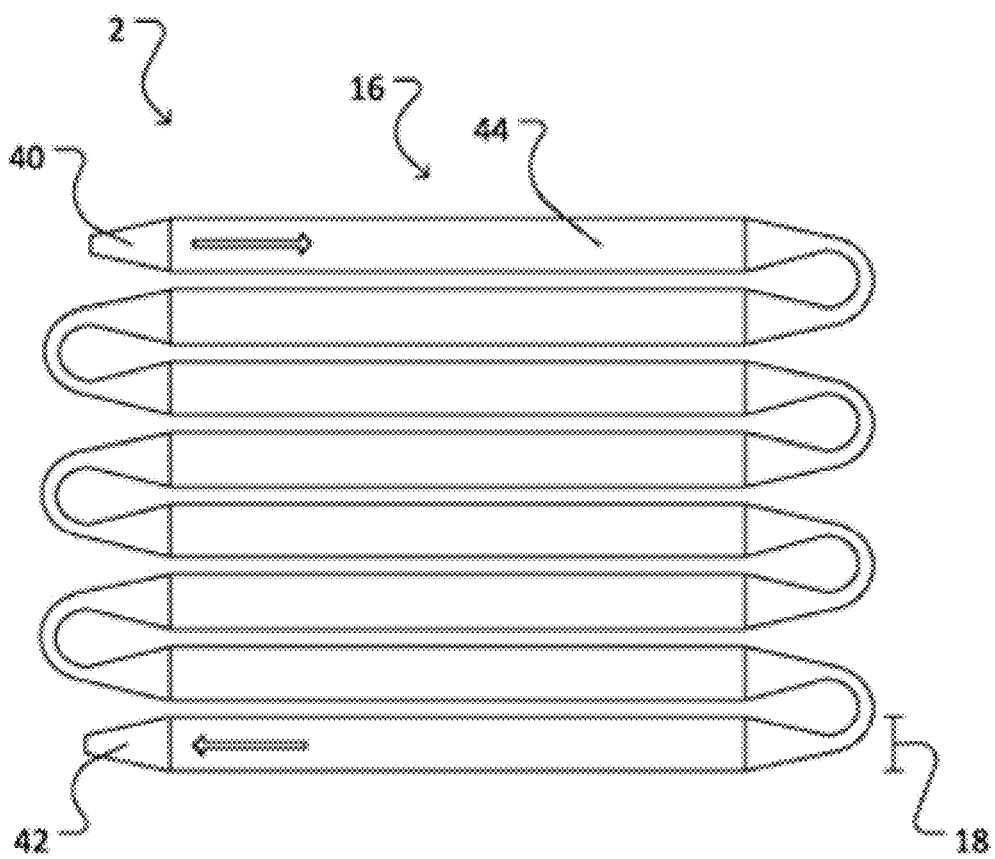
FIG. 6A is a top view of a fuel cell according to an embodiment of the invention.

As shown in FIG. 6A, anode chamber 16 includes an inlet 40, an outlet 42, and a plurality of channels 44 linked in a serpentine manner. In some embodiments, each channel 44 is dimensioned to facilitate uniform flow of electrolyte therethrough characterized by a substantially continuous pressure drop of electrolyte in the direction of electrolyte flow and substantially no pressure drop in the lateral direction. In some embodiments, each channel 44 has a length to width aspect ratio of 50:1 to 2:1, 25:1 to 4:1, or 10:1 to 5:1.

Figure 6B:
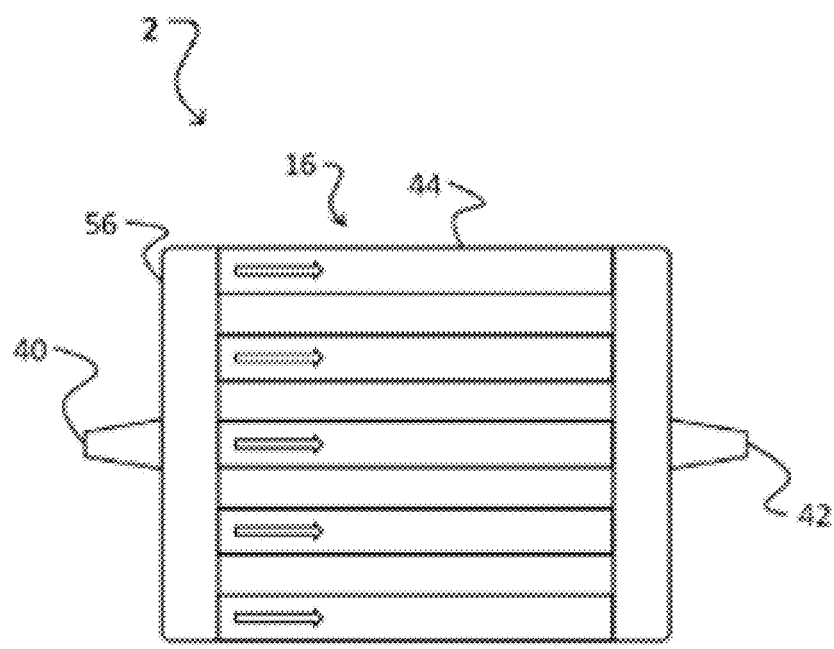
FIG. 6B is a top view of a fuel cell according to an embodiment of the invention.

In some embodiments channels 44 may be arranged in other configurations, such as in a parallel flow configuration as shown in FIG. 6B. Anode chamber 16 includes an inlet 40, an outlet 42, and a plurality of channels 44 linked in a parallel manner. In some embodiments, each channel 44 is dimensioned to facilitate uniform flow of electrolyte therethrough characterized by a substantially continuous pressure drop of electrolyte in the direction of electrolyte flow and substantially no pressure drop in the lateral direction. In some embodiments, each channel 44 has a length to width aspect ratio of 50:1 to 2:1, 25:1 to 4:1, or 10:1 to 5:1. A manifold 56 is used to facilitate distribution amongst parallel flow channels.

In some embodiments, other configuration of channels 44 can be formed as combinations of serpentine and parallel flow channels.

In operation, when electricity is required, metal particles 30 suspended in electrolyte are loaded into anode chamber 16 and air is loaded into cathode chamber 14. A uniform bed of metal particles 30 is controllably formed on anode current collector 18 by one or more of the following mechanisms: (i) maintaining the flow of metal particles 30 suspended in the electrolyte at a predetermined flow rate slow enough to allow some metal particles 30 to settle onto anode current collector 18; (ii) periodically stopping the flow of metal particles 30 suspended in the electrolyte to allow some metal particles 30 to settle onto anode current collector 18; and (iii) providing a plurality of particle collectors 32 as described herein on anode current collector 18 to collect metal particles 30. In some embodiments, for each of the foregoing mechanisms anode chamber 16 is oriented substantially horizontally to allow particles 30 to settle by gravity to form anode bed 34 on anode current collector 18.

Particles 30 of anode bed 34 are therefore in contact with anode current collector 18 and/or with other particles 30 in anode bed 34. The particles 30 along the top of anode bed 34 then undergo the anodic reaction. The anodic reaction occurs principally at the top of anode bed 34, and decreases in a direction downwards towards anode current collector 18.

Electrolyte flows over anode bed 34, in direct contact with particles 30, to allow the anodic reaction to occur. Electrolyte flowing to the reaction site also removes oxidized metal product (e.g. potassium zincate). Since electrolyte does not need to flow through anode bed 34 for the anodic reaction to occur, (i) lower electrolyte pressures may be used to lower pumping energy costs and reduce mechanical stress on fuel cell 2 and/or (ii) smaller metal particles 30 may be used to increase efficiency without increasing electrolyte pressure or decreasing the electrolyte flow rate. In some embodiments, the size of metal particles 30 may range from 5 nm to 1 mm, 5 nm to 0.5 mm, or 5 nm to 0.3 mm. Electrolyte flows principally across the top of the bed of zinc particles but some flow will penetrate into the bed. Similarly the potassium zincate formed by the slow anodic reaction at the bottommost portion of the anode bed 34 will percolate slowly back into the main flow of electrolyte.

Current may be drawn from fuel cell 2 by closing the circuit between cathode 14 and anode current collector 18 and applying a load. Current drawn through a fuel cell stack is facilitated by connecting the end plates and individual fuel cells are connected, for example with contact pin 22, and applying a load. In some embodiments a current density of 50 mA/cm$^2$ or greater is drawn by the load and discharge occurs for periods ranging from 1 to 20 hours. In some embodiments fuel cell 2 or fuel cell stack 10 is maintained in a substantially fully charged state even in a suspended state of active reaction by disconnecting the load. A substantially fully charged state of fuel cell 2 or fuel cell stack 10 is preserved by maintenance of a fully filled anode bed 34.

Formation of a uniform bed of particles 30 on anode current collector 18 is also facilitated by providing a uniform flow of the electrolyte through anode chamber 16. Uniform flow is achieved by providing a substantially continuous pressure drop in a downstream direction in anode chamber 16 and minimal or substantially no lateral pressure drop. In some embodiments, electrolyte throughout anode chamber 16 moves at substantially the same flow velocity, with substantially no areas of recirculation or "dead zones" of little or no flow.

In some embodiments, the flow rate of the electrolyte in anode chamber 16 ranges from 1 L/min. to 7 L/min., or 3 L/min. to 7 L/min., or 3 L/min. to 5 L/min.

In some embodiments, electrolyte is loaded into anode chamber 16 at a gauge pressure ranging from 0.69 kPa to 103.4 kPa, or 6.9 kPa to 82.7 kPa, or 13.8 kPa to 68.9 kPa. In some embodiments, the gauge pressure of electrolyte in the anode chamber is less than 34.5 kPa. Gauge pressure refers to pressure zero-referenced against atmospheric air pressure (i.e., the difference between absolute pressure and atmospheric pressure).

Figure 7:
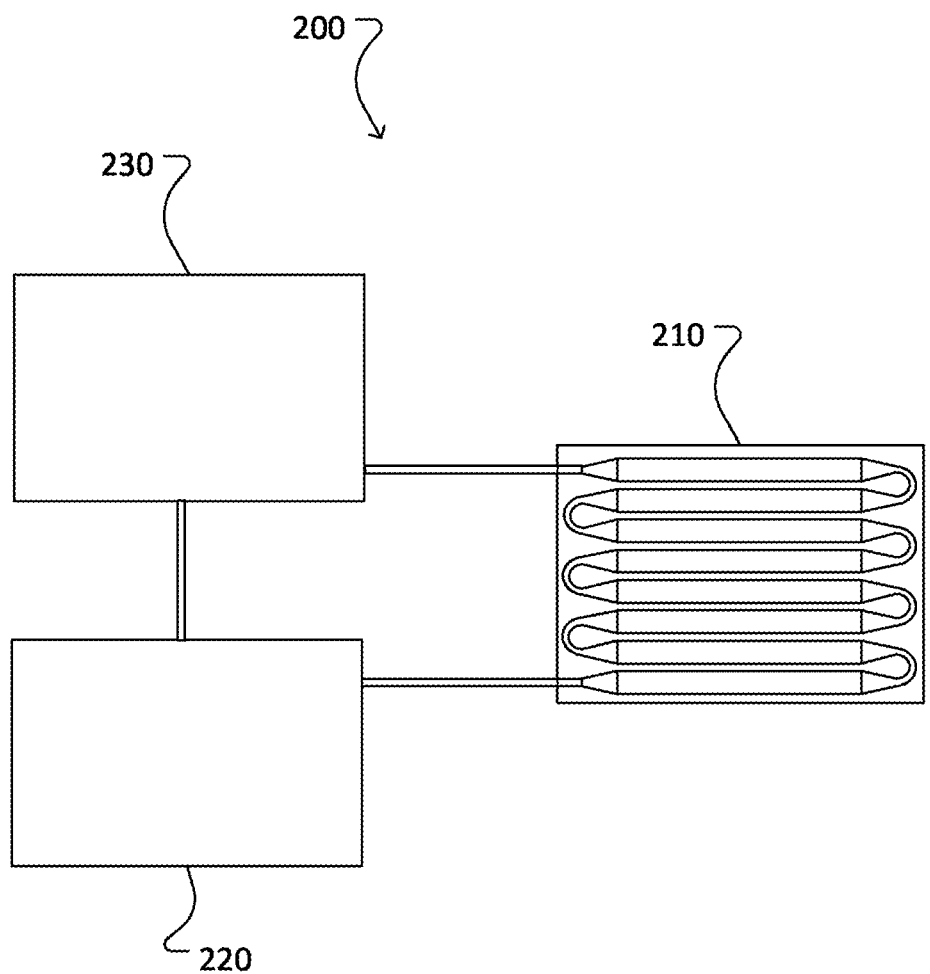
FIG. 7 is a schematic view of a metal-air fuel cell system according to an embodiment of the invention.

FIG. 7 shows a metal-air fuel cell system 200 according to one embodiment of the invention. System 200 includes a fuel cell 210, an electrolyzer 220 and a fresh fuel tank 230. Fuel cell 210 may for example comprise a fuel cell 2. Fuel cell 210 may also comprise a plurality of fuel cells 2 to form a fuel cell stack. One or more pumps (not shown) pump electrolyte and metal particles and/or product species through system 200. In particular, spent fuel (e.g., oxidized metal, such as zincate) is pumped from the outlet of fuel cell 210 to tank 230 where it can be stored. The spent fuel can then be pumped from tank 230 to electrolyzer 220. In some embodiments, spent fuel may be pumped from fuel cell 210 directly to electrolyzer 220. Electrolyzer 220 regenerates the metal fuel, which is subsequently pumped to tank 230. The metal fuel may for example be dendritic zinc powder ranging in size from 5 nm to 1 mm, 5 nm to 0.5 mm, or 5 nm to 0.3 mm. This metal fuel is stored in tank 230 until required for use by fuel cell 210. In some embodiments regenerated metal fuel may be pumped directly back into fuel cell 210.

Where a component (e.g. cathode, anode current collector, etc.) is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments of the invention.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

What is claimed is:

1. A method of charging a metal-air fuel cell, the method comprising the steps of:
   (a) orienting an anode chamber horizontally wherein a corresponding anode current collector is positioned below the anode chamber, the anode current collector comprising a plurality of particle collectors projecting into the anode chamber;
   (b) providing metal particles suspending in an electrolyte to flow through the anode chamber in a downstream direction orientated horizontally;
   (c) allowing a bed of the metal particles to form on the anode current collector, wherein the plurality of particle collectors perturb the flow of the electrolyte through the anode chamber and encourage settling of the metal particles one of on and between the particle collectors; and (d) maintaining uniform formation of the bed.

2. The method according to claim 1, wherein step (c) comprises at least one of:
   (i) maintaining the flow of the metal particles suspended in the electrolyte at a predetermined flow rate; and
   (ii) periodically stopping the flow of the metal particles suspended in the electrolyte.

3. The method according to claim 2, wherein step (d) comprises providing a uniform flow of the electrolyte through the anode chamber.

4. The method according to claim 3, wherein providing the uniform flow comprises providing a continuous pressure drop in a downstream direction in the anode chamber and a minimal pressure drop in a direction normal to the downstream direction.

5. The method according to claim 4, wherein providing the continuous pressure drop in the downstream direction and the minimal pressure drop in the direction normal to the downstream direction comprises providing one of a parallel flow and a serpentine flow path for the anode chamber.

6. The method according to claim 3, wherein a flow velocity of the electrolyte in the anode chamber ranges from 1 $cm^3$/s to 5000 $cm^3$/s.

7. The method according to claim 6, wherein a flow rate of the electrolyte in the anode chamber ranges from one of 1 L/min. to 7 L/min, 3 L/min. to 7 L/min, and 3 L/min. to 5 L/min.

8. The method according to claim 7, wherein a gauge pressure of the electrolyte in the anode chamber ranges from one of 0.69 kPa to 103.4 kPa and 13.8 kPa to 68.9 kPa.

9. The method according to claim 8, wherein a pressure drop traversing the anode chamber is less than 103.4 kPa.

10. The method according to claim 9, wherein the metal particles are zinc particles and the electrolyte is aqueous potassium hydroxide.

11. The method according to claim 10, further comprising a step of drawing a current density of at least 50 $mA/cm^2$ from the fuel cell.

12. The method according to claim 11, further comprising a step of applying a load to the fuel cell.

13. The method according to claim 12, further comprising a step of discharging for a period of 1 to 20 hours.

* * * * *